(12) United States Patent
Matharu

(10) Patent No.: US 8,718,599 B2
(45) Date of Patent: May 6, 2014

(54) USAGE NOTIFICATION FOR A MOBILE DEVICE

(75) Inventor: Manpreet S. Matharu, Laurel, MD (US)

(73) Assignee: Verizon Services Corp., Ashburn, VA (US)

( * ) Notice: Subject to any disclaimer, the term of this patent is extended or adjusted under 35 U.S.C. 154(b) by 1377 days.

(21) Appl. No.: 11/474,994

(22) Filed: Jun. 27, 2006

(65) Prior Publication Data

US 2007/0298787 A1 Dec. 27, 2007

(51) Int. Cl.
*H04M 11/00* (2006.01)

(52) U.S. Cl.
USPC ........... 455/405; 455/406; 455/407; 455/408; 379/114.01; 379/114.09; 379/114.21; 379/114.28

(58) Field of Classification Search
USPC .............. 455/405–408, 432.3, 2.01; 379/111, 379/114.03, 114.28, 13, 114.01, 379/114.05–114.1, 114.27, 130; 705/32, 705/34, 40
See application file for complete search history.

(56) References Cited

U.S. PATENT DOCUMENTS

| | | | | |
|---|---|---|---|---|
| 4,879,742 A | * | 11/1989 | Taniguchi et al. | 379/111 |
| 4,888,822 A | * | 12/1989 | Weinberger et al. | 379/130 |
| 5,559,871 A | | 9/1996 | Smith | |
| 6,345,182 B1 | | 2/2002 | Fabritius et al. | |
| 6,347,224 B1 | * | 2/2002 | Smyth et al. | 455/406 |
| 6,782,084 B2 | | 8/2004 | Kondo et al. | |
| 6,928,150 B2 | | 8/2005 | Johnston | |
| 6,934,527 B1 | * | 8/2005 | Hamada | 455/405 |
| 7,054,940 B2 | | 5/2006 | Litwin | |
| 7,245,901 B2 | * | 7/2007 | McGregor et al. | 455/406 |
| 7,263,346 B2 | * | 8/2007 | Gruchala et al. | 455/405 |
| 7,450,927 B1 | * | 11/2008 | Creswell et al. | 455/405 |
| 2004/0248570 A1 | * | 12/2004 | Denenberg et al. | 455/432.3 |
| 2005/0069112 A1 | * | 3/2005 | Hlasny | 379/126 |
| 2005/0096010 A1 | * | 5/2005 | Benco et al. | 455/406 |
| 2007/0213030 A1 | * | 9/2007 | Benco et al. | 455/405 |
| 2007/0230680 A1 | * | 10/2007 | McCann | 379/221.13 |
| 2007/0275692 A1 | * | 11/2007 | Gruchala et al. | 455/405 |
| 2009/0068980 A1 | * | 3/2009 | Creswell et al. | 455/405 |

FOREIGN PATENT DOCUMENTS

CN 1376357 10/2002

OTHER PUBLICATIONS

International Search Report dated Sep. 23, 2008 (2 pages).

* cited by examiner

*Primary Examiner* — Allahyar Kasraian

(57) ABSTRACT

A communication is received via a telecommunications network. A determination is made concerning whether a monetary surcharge is associated with the communication, and a notification is transmitted concerning the determination.

20 Claims, 4 Drawing Sheets

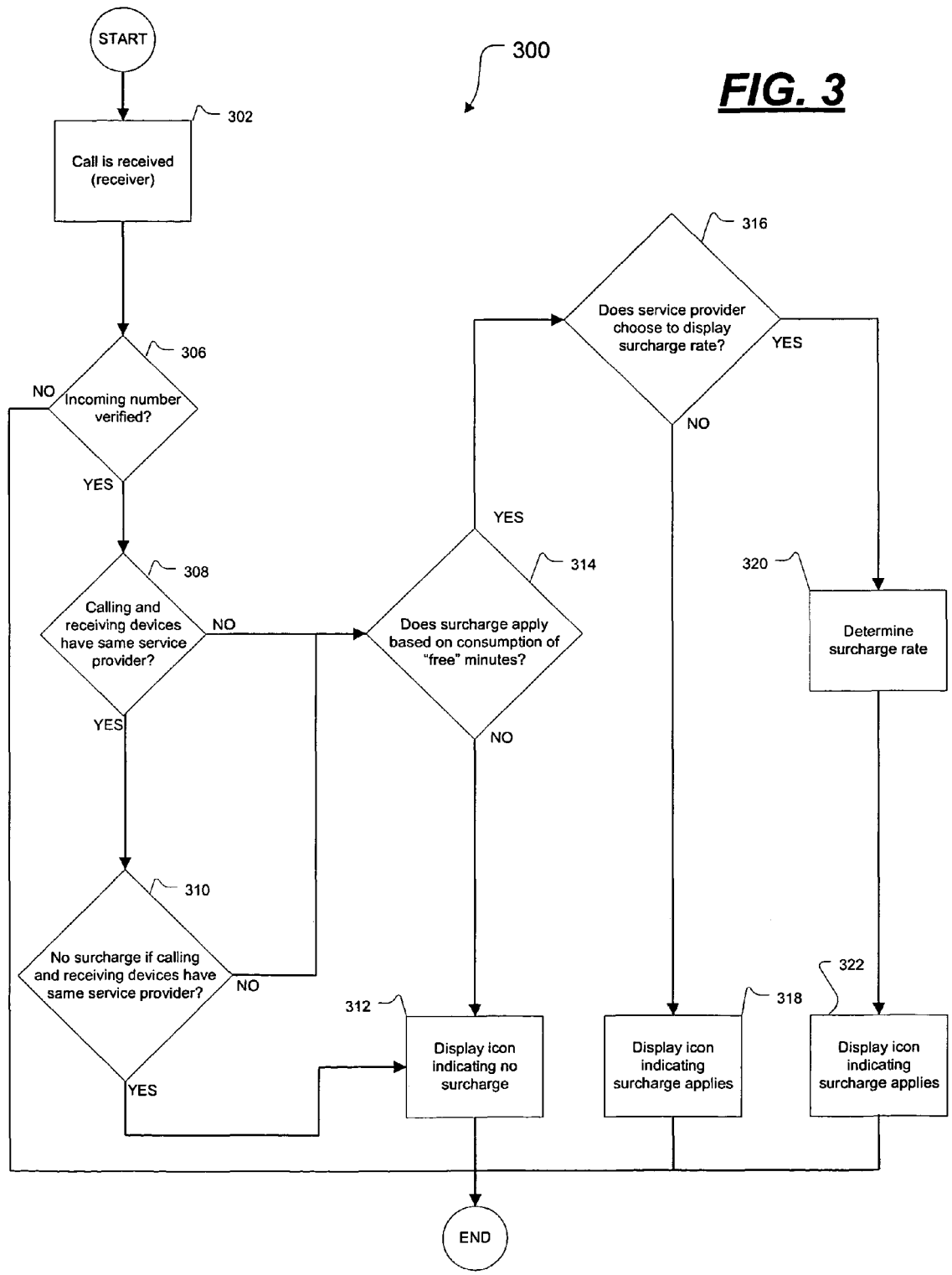

USAGE NOTIFICATION FOR A MOBILE DEVICE

BACKGROUND

Telecommunications service providers generally provide telecommunication services to their customers under a variety of service plans. Such service plans are generally associated with one or more devices, such as a wireless telephone, and generally require a subscriber to pay a basic, e.g., monthly, fee for using the device on a telecommunications network. Such service plans further generally impose various surcharges for services falling into certain categories. Some types of calls may be free of surcharges, such as calls made at certain times of day, e.g., during "night" or "weekend" periods, or calls made to other customers of the same service provider. Further, in many cases, a surcharge is not assessed for a call in a particular category until the customer's usage in that category for a particular billing period, e.g., month, is surpassed. However, once a base amount of time included in a service plan for a given service in a given period has been used, a surcharge may be imposed for additional usage of the given service, e.g., on a per minute basis. Additionally, extra charges may be imposed for other services, such as long-distance calls, international calls, calls to customers of a different service provider, or calls made from outside a predetermined geographic area. Where data services are provided, surcharges may be imposed for data provided at a rate above a predetermined rate, at quantities over a certain amount per time period (e.g., 10 MB per month), at certain times of day, in certain geographic areas, etc. It has become more and more common for such service plans to be offered for all kinds of telecommunications services, including wireless telephone services, "land line" telephone services, etc.

Unfortunately, in light of the different charges that may be assessed at different times for different services, it is presently difficult for telecommunications customers to be aware of surcharges as they are being incurred. For example, it is presently difficult for a customer to be aware of both the time of a phone call and whether there is a surcharge for calls at that time, and also to be aware of the amount of usage during a billing period for the type of call being made or received. This difficulty is exacerbated by the fact that information regarding a customer's usage provided by a service provider generally lags the customer's actual usage for the present billing period. Customers presently are forced to estimate or even guess the extent to which they have used services covered by a basic monthly fee, and the extent to which they have incurred charges above the basic monthly fee.

Further, information presently provided to users of telecommunications devices, such as wireless telephones, is insufficient for users to determine whether a surcharge is being incurred. For example, a user may see an icon that indicates "roaming." However, present icons are not actually associated with a determination of whether a surcharge will be applied to a call. Moreover, a user is unlikely to know whether, for a particular calling plan, the icon is associated with a surcharge. Accordingly, presently displayed icons are confusing at best, and suffer from significant drawbacks related to determining whether a surcharge applies to a call.

BRIEF DESCRIPTION OF THE DRAWINGS

FIG. 3 illustrates an exemplary process for notifying a user receiving a call whether they are incurring extra fees according to an embodiment.

DETAILED DESCRIPTION OF THE PREFERRED EMBODIMENTS

Overview

Figure 1:
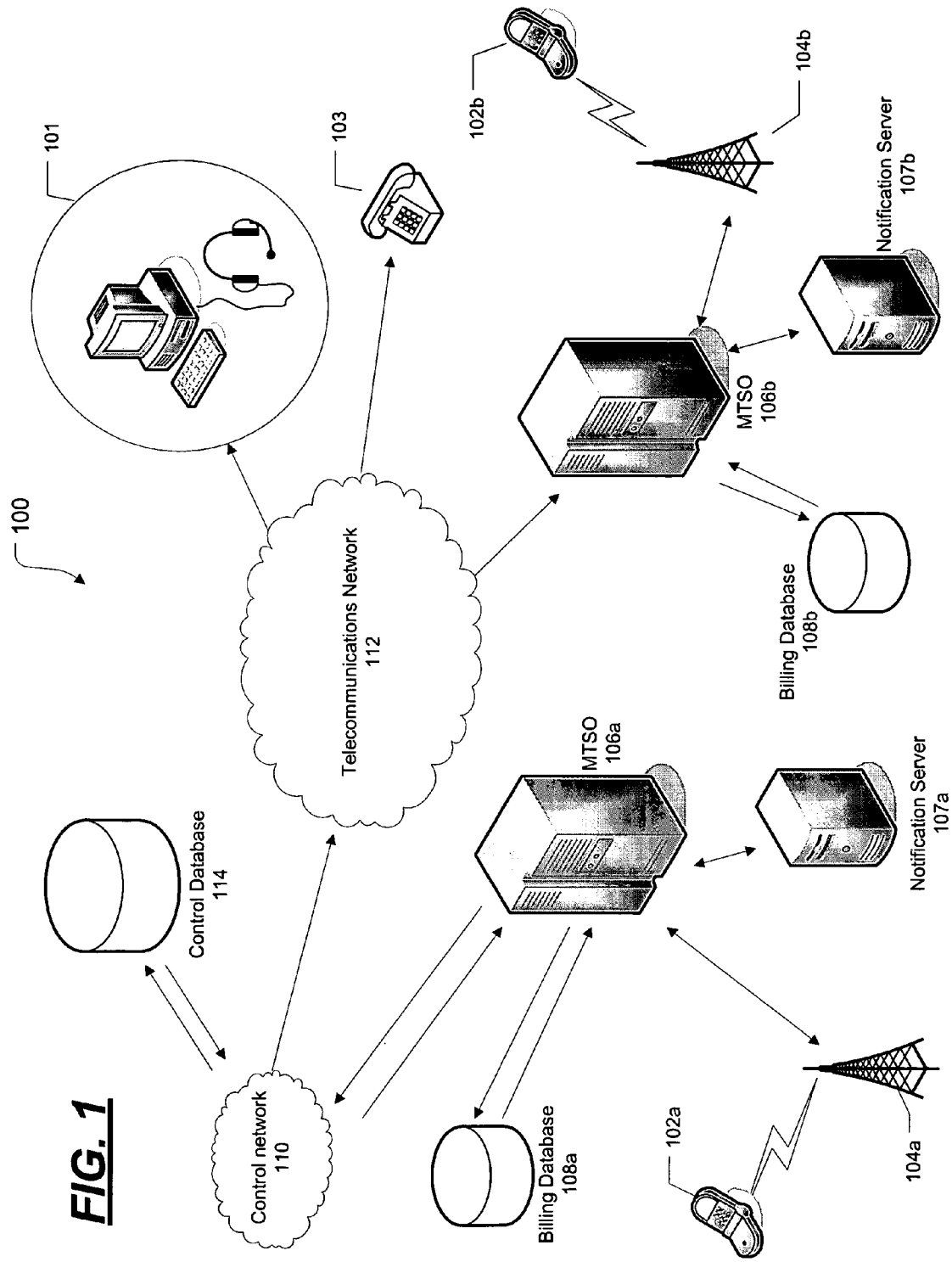
FIG. 1 illustrates an architecture of a communication system, according to an embodiment.

FIG. 1 illustrates a general architecture and operation of a telecommunications system 100, according to an embodiment. Wireless devices 102a and 102b, along with conventional telephone 103, and computing device 101 may place and receive communications ("calls") in system 100. Wireless devices 102a and 102b may be wireless telephones, although other kinds of telecommunications devices may be included in various embodiments. For example, wireless devices 102 could include a variety of devices used to place and receive voice telephony calls and transmit or receive data communications, such as personal computers, laptop computers, handheld computers, personal digital assistants, wireless e-mail devices, or devices that include some combination of a computer and a telephone. Computing device 101 may similarly include a variety of devices that support internet protocol (IP) telephony, including personal computers, laptop computers, handheld computers, personal digital assistants, etc.

Further, it is to be understood that there may be a large number of telecommunications devices in communication with or through system 100 at any given time. Similarly, FIG. 1 depicts two towers 104 to allow wireless devices 102 to communicate with system 100, although it is to be understood that system 100 likely will include hundreds if not thousands of towers 104. Moreover, FIG. 1 should not be interpreted to suggest that there is necessarily any geographic limitation to system 100. In fact, system 100 may facilitate communications between different cites, states, and even countries.

Communications through system 100, such as voice telephone or data communications, may be initiated when a device 102 communicates with a local tower 104 within range of device 102. Tower 104 transmits communication signals from device 102 to Mobile Telephone Switching Office (MTSO) 106. Each MTSO 106 is associated with one or more towers 104 and each generally simultaneously or nearly simultaneously handles communications for a plurality of wireless devices 102, including at least monitoring all communications, e.g., calls, tracking the location of each device 102, e.g., phone, and arranging handoffs between the various towers as may be necessary to enable mobility. Communications through system 100 may also be initiated when a call is placed by computing device 101 or conventional telephone 103 through network 112, as is well known.

The structure and operations of MTSO 106 is generally known. MTSO 106 generally includes one or more specialized computers to control a cellular telephone network. It is to be understood that embodiments are possible in which the functions of MTSO 106 are provided by other devices.

Notification server 107 may be included in MTSO 106, either as software and hardware added to existing MTSO 106 infrastructure, or as computer software implemented on existing MTSO 106 hardware. Notification server 107 functions to provide notifications to users of devices 102 and 103 concerning usage of various services provided according to a service plan.

Notification server 107 may be in communication with billing database 108, which includes information regarding a service plan associated with device 102, such as how many minutes may be allocated to that plan, what types of calls may be made using device 102, etc. Billing database 108 also includes information concerning surcharges applicable for various types of communications, such as calls made a particular time of day, downloads of data, etc. It is to be understood that the surcharges discussed herein are monetary surcharges, that is, additional amounts of money that a customer may be charged for particular kinds of services, services provided at particular times of day, etc. By querying database 108 it is possible to determine whether surcharges apply to a particular communication, such as a telephone call, to or from wireless device 102.

Different MTSOs 106 are generally linked by a control network 110 and a telecommunications network 112. As is known, control network 110 may provide supervising, alerting, and addressing functions. Control network 110 is in further communication with control database 114 which generally provides telephone number exchange information to control network 110. In one embodiment, control network 110 may communicate using Switching System 7 (SS7) messaging. Telecommunications network 112 may be a packet-switched network, such as an internet protocol (IP) network, and/or a circuit-switched network such as the public switched telephone network (PSTN). Accordingly, it is to be understood that network 112 includes switches, links, routers, gateways, etc. as necessary to facilitate the transmission of calls and data between devices 101, 102 and 103. In some embodiments, control network 110 and telecommunications network 112 may be provided on a single actual network infrastructure, while in other embodiments control network 110 and telecommunications network 112 may be separate networks.

Communication signals from wireless device 102 are transmitted via network 112 when a user of a device 102 places a call or initiates other data communications. Network 112 generally routes calls from device 102 through a circuit-switched or packet-switched network to a receiver device 102.

Communication signals may also be directed to computing device 101 and/or conventional telephone 103. Calls placed and/or received by computing device 101 may be subject to various surcharges. Generally, calls received on a conventional telephone 103 are not associated with any surcharges, regardless of the type of call received by conventional telephone 103, although embodiments are possible in which such surcharges are imposed. More frequently, calls placed using conventional telephone 103 are associated with surcharges or fees. Billing database 108 may include data for computing device 101 and/or conventional telephone 103 that may be used to determine whether surcharges apply to a call placed to or from computing device 101 or conventional telephone 103.

Where notification server 107 is a separate or additional piece of hardware in MTSO 106, notification server 107 may include any one of a number of known computing devices, including, without limitation, a computer workstation, a desktop, notebook, laptop, or handheld computer, or some other known computing device. Computing devices such as the foregoing may employ any of a number of known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices in various embodiments such as notification server 107 may each include instructions executable by one or more computing devices such as those listed above. Such instructions may be compiled or interpreted from computer programs created using a variety of known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases 108 and 114 generally comprise a structured file (e.g., comma delimited, tab delimited, etc.) or a relational database management system (RDBMS) as is well known. An RDBMS generally employs the well known Structured Query Language (SQL) in addition to a language for creating, storing, editing, and executing stored procedures. However, it is to be understood that databases 110 may be some other kind of database such as a hierarchical database, a file, a set of files, an application database in a proprietary format, etc. Database 110 generally includes a computing device employing a computer operating system such as one of those mentioned above, and is accessible via a networking technology as is well known, such as a local area network (LAN), wide area network (WAN), etc.

Although a specific exemplary system 100 is depicted in FIG. 1, a system implemented according to the present invention may include additional components or the components described above interconnected in various other configurations. For example, any or all of notification server 107, billing database 108 and control database 114 may be directly connected to networks 110 and/or 112. In addition, MTSOs 106 may be replaced or incorporated within other switching platforms, for example, with known circuit switching equipment or known packet-switching/routing equipment—which may serve computing devices 101 and telephones 103.

Exemplary Process

Figure 2:
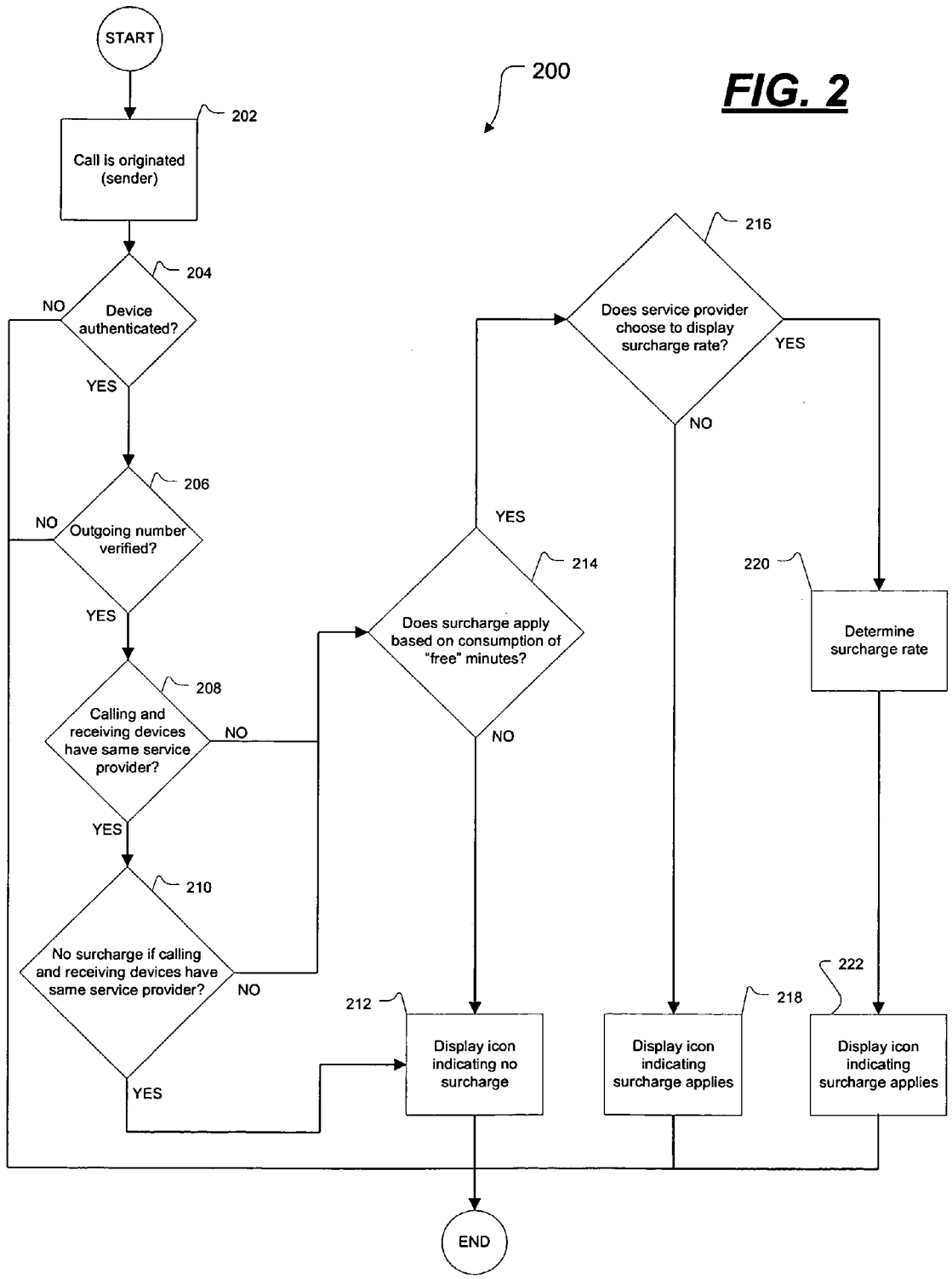
FIG. 2 illustrates an exemplary process for notifying a user placing a call whether they are incurring extra fees according to an embodiment.

FIG. 2 illustrates a process 200 for providing notification to a user of a device 101, 102 or 103 concerning usage of various telecommunications services, according to an embodiment. Throughout the descriptions of FIGS. 2 and 3 below, a device 102*a* signifies a device that places a call, and a device 102*b* signifies a device that receives a call. It is to be understood that devices 101 or 103 could also be signified. Further, although the discussion of FIGS. 2 and 3 refers to sending and receiving mobile telephony calls, it is to be understood that usage notification as disclosed herein could be provided for other kinds of communications, such as wireless to wireline telephony calls and data communication calls.

At step 202, a call is originated from device 102a. Device 102a transmits to MTSO 106, through tower 104, a telephone number to be called.

Next, in step 204, MTSO 106 confirms authorization of device 102a which placed the call of step 202 to use the services provided by the service provider. Authorization may include querying billing database 108, and generally includes determining whether the device 102a is associated with an active service plan or is otherwise authorized to place calls through MTSO 106. If device 102a is not authorized, process 200 is terminated. Otherwise, process 200 proceeds to step 206.

Next, in step 206, MTSO 106 queries control database 114 for the outgoing telephone number submitted in step 202 to verify that the outgoing number exists and is associated with a device 101, 102, 103, etc. capable of receiving the call originated in step 202. If the outgoing number cannot be verified, process 200 is terminated. Otherwise, process 200 proceeds to step 208.

Next, in step 208, it is determined whether one and the same service provider provides service to the telephone number transmitted in step 202 and device 102a. Notification server 107 may query billing database 108 to determine whether the foregoing telephone number is associated with a particular service provider, e.g., the provider providing service to device 102a. If the determination of step 208 is positive, process 200 proceeds to step 210. Otherwise, process 200 proceeds to step 214.

In step 210, it is determined whether device 102a is associated with a service plan that provides for calls to other devices 102 provided by the service provider providing device 102a without the imposition of a surcharge. Again, notification server 107 may query billing database 108 for information regarding a service plan associated with device 102a to make this determination. If the determination is positive, process 200 proceeds to step 212. Otherwise, process 200 proceeds to step 214.

Figure 4A:
FIG. 4A illustrates a device displaying a notification, according to an embodiment.

In step 212, an icon is displayed on a display of device 102a to indicate that the call initiated in step 202 will not incur a monetary surcharge. Virtually any icon may be used, including symbols and letters. However, it is preferable that the icon clearly indicate whether a surcharge is being incurred, and therefore icons such as "$," "NC" (i.e., no charge) and the like are preferably used. As one example, and as illustrated in FIG. 4A, "NC" may be displayed on a display of device 102a to indicate that no surcharge is associated with a telecommunications event such as the call initiated in step 202.

One embodiment includes a dedicated surcharge indicator icon that, when off, i.e., not displayed, indicates that no surcharge is being incurred and when on, i.e., when displayed, indicates that a surcharge is being incurred. Of course, other embodiments utilizing a binary surcharge indicator are also possible, e.g., "C" could be used to indicate that a surcharge is being incurred, and "N" could be used to indicate that no surcharge is being incurred.

Following step 212, process 200 terminates.

In step 214, notification server 107 performs further queries to determine whether a surcharge will be incurred for the call initiated in step 202. If step 214 is executed, it has been determined either (1) in step 208 that device 102a has transmitted a telephone number for a device 102b provided by a different service provider than the service provider for the device 102 that transmitted the number, or (2) in step 210 that device 102a is associated with a service plan that imposes a surcharge for calls to other devices 102b regardless of the service provider for the device 102a. Accordingly, in step 214, notification server 107 queries billing database 108 and determines whether device 102a has "free" time remaining in an associated billing plan that may be used for the call initiated in step 202, i.e., whether a surcharge applies to the call based on minutes of service consumed during a billing period. If no surcharge is to be applied, process 200 proceeds to step 212. Otherwise, process 200 proceeds to step 216.

In step 216, notification server 107 determines, generally by querying billing database 108, whether the service provider for device 102a has chosen to display the rate or amount of a surcharge to the user of device 102a. If not, process 200 proceeds to step 218. If yes, process 200 proceeds to step 220.

Figure 4B:
FIG. 4B illustrates a device displaying a notification, according to an embodiment.

In step 218, an icon is displayed on device 102a which indicates that a fee or additional charge is associated with the call. This may be accomplished with a binary surcharge indicator icon as described above, a simple dollar sign icon, or letters and/or words indicating that the user is incurring additional charges to make that particular call. Again, it is preferable that the icon clearly indicate whether a surcharge is being incurred. As an example, and as illustrated in FIG. 4B, "$" may be displayed on a display of device 102a to indicate that a surcharge is associated with a telecommunications event such as the call initiated in step 202. Following step 218, process 200 ends.

In step 220, notification server 107 queries billing database 108 to determine a surcharge or surcharge rate for the call initiated in step 202 according to, e.g., the service plan associated with device 102a and the characteristics of the call placed in step 202, e.g., whether the call is to a device 102b provided by a different service provider, whether the call is a long distance call, etc.

Figure 4C:
FIG. 4C illustrates a device displaying a notification, according to an embodiment.

Next, in step 222, an icon is displayed on device 102a indicating a surcharge being applied for the call placed in step 202, e.g., an actual billing rate per unit of time, e.g., minute. As an example, and as illustrated in FIG. 4C, "$0.50/min." may be displayed on a display of device 102a to indicate that a surcharge of $0.50 per minute is associated with a telecommunications event such as the call initiated in step 202. Following step 22, process 200 ends.

Turning now to FIG. 3, a process 300 according to an embodiment is illustrated wherein notification concerning surcharges is provided to a device 102b receiving a telephone call. Process flow 300 is similar to process flow 200 described above with reference to FIG. 2, with certain steps being modified to accommodate the viewpoint of device 102b. For example, in step 306 a telephone call is received in MTSO 106, and in step 308 notification server 107 determines whether one and the same service provider provides service to the telephone number of device 102a placing a call in step 302 and device 102b receiving that call. Preferably, when wireless device 102b receives a phone call from any other wireless device 102a or conventional telephone 103, process 300 generally takes place within a notification server 107b associated with wireless device 102b (see FIG. 1).

Generally, process 300 is concerned with notifying a user receiving a call from any phone whether there will be surcharges associated with the call. Preferably, any icon regarding the association of any surcharges with the call is provided to wireless device 102b before the call is answered. The user of wireless device 102b could thus simply decline to answer the call upon seeing that a surcharge may be associated with it.

CONCLUSION

Reference in the specification to "one embodiment" or "an embodiment" means that a particular feature, structure, or characteristic described in connection with the embodiment is included in at least one embodiment. The phrase "in one embodiment" in various places in the specification does not necessarily refer to the same embodiment each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving by a notification device a request for a communication between a calling device and a called device via a telecommunications network;
   determining with the notification device a service provider and a service plan associated with the calling device and a service provider and a service plan associated with the called device by automatically querying a billing database;
   determining with the notification device, when the service providers associated with each device are different:
      based on a number of time units available for the communication not exceeding a predetermined threshold that the service plans do not impose a monetary surcharge,
      based on the number of time units available for the communication exceeding the predetermined threshold that the service plans impose a monetary surcharge, and
      whether the service plans indicate that the service providers have selected to provide a surcharge rate when the number of time units available for the communication exceeds the predetermined threshold;
   transmitting by the notification device a surcharge notification to at least one of the calling device or the called device that causes at least one of the calling device or the called device to display a surcharge indicator, the surcharge indicator indicating that the monetary surcharge has been imposed when the number of time units available for the communication exceeds the predetermined threshold, the surcharge indicator including the surcharge rate when the service plans indicate that the service providers have selected to provide the surcharge rate;
   receiving an indication in response to the surcharge notification from the called device to accept the communication; and
   establishing the communication between the calling device and the called device after receiving the indication.

2. The method of claim 1, wherein the surcharge notification includes at least one of:
   an amount of the monetary surcharge, the surcharge rate, and the surcharge indicator.

3. The method of claim 1, further comprising determining a time of day, and
   determining whether the monetary surcharge is imposed based on the time of day.

4. A tangible and non-transitory computer-readable medium containing processor-executable instructions, said instructions being configured to cause a processor to perform the method of claim 1.

5. The method of claim 1, further comprising authenticating at least one of the calling device and the called device.

6. The method of claim 1, further comprising transmitting the surcharge notification to at least one of the calling device and the called device before establishing the communication when the calling device and the called device are served by different service providers and the number of available time units does not exceed a pre-determined threshold; and
   wherein the surcharge notification to the called device includes at least one of an amount of the monetary surcharge and the surcharge rate; and the surcharge notification to the calling device includes an indication that no monetary surcharge is being imposed.

7. The method of claim 1, further comprising receiving an indication from the called device to accept the communication after transmitting the surcharge notification to the called device.

8. The method of claim 1, further comprising causing the display of the surcharge indicator on the called device before receiving the indication from the called device to accept the communication from the calling device.

9. The method of claim 1, wherein the surcharge indicator is an icon.

10. The method of claim 1, further comprising
    determining with the notification device the surcharge rate for the monetary surcharge when the service plans indicate that the service providers have selected to provide the surcharge rate.

11. The method of claim 1, wherein the surcharge indicator is a no-charge indicator when the number of time units available for the communication does not exceed the predetermined threshold.

12. A system, comprising:
    a billing database;
    a switching device that selectively receives and sends a request for a communication between a calling device and a called device via a telecommunications network; and a notification device communicatively connected to the billing database and the switching device and configured to:
  determine a service provider and a service plan associated with the calling device and a service provider and a service plan associated with the called device by automatically querying the billing database;
  determine, when the service providers associated with each device are different:
    based on a number of time units available for the communication not exceeding a predetermined threshold that the service plans do not impose a monetary surcharge,
    based on the number of time units available for the communication exceeding the predetermined threshold that the service plans impose a monetary surcharge, and
    whether the service plans indicate that the service providers have selected to provide a surcharge rate when the number of time units available for the communication exceeds the predetermined threshold;
  transmit a surcharge notification to at least one of the calling device or the called device that causes at least one of the calling device or the called device to display a surcharge indicator, the surcharge indicator indicating that the monetary surcharge has been imposed when the number of time units available for the communication exceeds the predetermined threshold, the surcharge indicator including the surcharge rate when the service plans indicate that the service providers have selected to provide the surcharge rate;
  receive an indication in response to the surcharge notification from the called device to accept the communication; and
  send an instruction to the switching device to establish the communication between the calling device and the called device after receiving the indication.

13. The system of claim 12, further comprising the notification device being configured to
  determine a time of day, and
  determine whether the monetary surcharge is imposed based on the time of day.

14. The system of claim 12, wherein at least one of the calling device and the called device is one of a wireless telephone, a handheld computer, a laptop computer, and a personal computer.

15. The system of claim 12, wherein the surcharge notification comprises at least one of an amount of the monetary surcharge, the surcharge rate, and the surcharge indicator.

16. The system of claim 12, wherein the switching device is further configured to authenticate at least one of the calling device and the called device.

17. A method, comprising:
  receiving, from a first device, a request to establish a communication with a second device via a telecommunications network;
  determining a service provider and a service plan associated with the first device and a service provider and a service plan associated with the second device by automatically querying a billing database;
  determining, when the service providers associated with each device are different:
    based on a number of time units available for the communication not exceeding a predetermined threshold that the service plans do not impose a monetary surcharge,
    based on the number of time units available for the communication exceeding the predetermined threshold that the service plans impose a monetary surcharge, and
    whether the service plans indicate that the service providers have selected to provide a surcharge rate when the number of time units available for the communication exceeds the predetermined threshold;
  transmitting a surcharge notification to at least one of the calling device or the called device that causes at least one of the calling device or the called device to display a surcharge indicator, the surcharge indicator indicating that the monetary surcharge has been imposed when the number of time units available for the communication exceeds the predetermined threshold, the surcharge indicator including the surcharge rate when the service plans indicate that the service providers have selected to provide the surcharge rate;
  receiving an indication in response to the surcharge notification from the second device to accept the communication; and
  establishing the communication between the first and second devices after receiving the indication.

18. The method of claim 17, wherein the surcharge notification comprises at least one of an amount of the monetary surcharge, the surcharge rate, and the surcharge indicator.

19. A tangible and non-transitory computer-readable medium containing processor-executable instructions, said instructions being configured to cause a processor to perform the method of claim 17.

20. The method of claim 17, further comprising authenticating at least one of the first and second devices.

* * * * *